US011062336B2

(12) United States Patent
Poreh et al.

(10) Patent No.: US 11,062,336 B2
(45) Date of Patent: Jul. 13, 2021

(54) SELF-LEARNING VALUATION

(71) Applicant: Qbeats Inc., New York, NY (US)

(72) Inventors: Ilan Poreh, New York, NY (US); Assaf Zeevi, New York, NY (US)

( * ) Notice: Subject to any disclaimer, the term of this patent is extended or adjusted under 35 U.S.C. 154(b) by 1112 days.

(21) Appl. No.: 15/451,780

(22) Filed: Mar. 7, 2017

(65) Prior Publication Data

US 2017/0255953 A1 Sep. 7, 2017

Related U.S. Application Data

(60) Provisional application No. 62/304,836, filed on Mar. 7, 2016.

(51) Int. Cl.
*G06Q 30/02* (2012.01)
(52) U.S. Cl.
CPC ..... *G06Q 30/0206* (2013.01); *G06Q 30/0277* (2013.01)
(58) Field of Classification Search
USPC ............................................... 705/7.11–7.42
See application file for complete search history.

(56) References Cited

U.S. PATENT DOCUMENTS

| 5,675,390 A | 10/1997 | Schindler et al. |
| 5,960,411 A | 9/1999 | Hartman et al. |
| 6,057,872 A | 5/2000 | Candelore |

(Continued)

FOREIGN PATENT DOCUMENTS

| EP | 0873645 B1 | 11/2004 |
| WO | 0042555 A1 | 7/2000 |

(Continued)

OTHER PUBLICATIONS

Cole, James, "Economic Issues of Intellectual Property Rights and Pricing for Digital Information on Computer Networks", San Jose State University, May 1996, pp. 1-109. (Year: 1996).*

(Continued)

*Primary Examiner* — Amber A Misiaszek
(74) *Attorney, Agent, or Firm* — Edell, Shapiro & Finnan, LLC

(57) ABSTRACT

A method of valuating a plurality of digital content items and offering the valuated plurality of digital content items for sale to consumers on devices connected to a network, the method including: on a processor connected to the network receiving the plurality of digital content items; for each received content item: establishing a plurality of attributes from content and characteristics of the content item; establishing a lifetime indicating span of consumers interest in the content item; producing a valuation function for calculating a market value of the content item during its lifetime by finding and ranking nearest one or more previously processed content items having the plurality of attributes with closest similarity to the plurality of attributes of the received content item, performing weighted averaging of the valuation functions produced for the nearest one or more of the previously processed content items; and adapting, using "edge cutting" adaptation, the produced valuation function to a market response reflecting behavior of the consumers in response to the market values of the content item calculated by the valuation function.

19 Claims, 10 Drawing Sheets

(56) References Cited

U.S. PATENT DOCUMENTS

| | | | |
|---|---|---|---|
| D440,970 S | 4/2001 | Henderson et al. |
| 6,411,924 B1 | 6/2002 | de Hita et al. |
| 6,668,256 B1 | 12/2003 | Lynch |
| 6,865,677 B1 | 3/2005 | Echizen et al. |
| 6,912,521 B2 | 6/2005 | Kraft et al. |
| 7,287,218 B1 | 10/2007 | Knotz et al. |
| 7,447,646 B1 | 11/2008 | Agarwal et al. |
| 7,801,824 B1 | 9/2010 | Bryar et al. |
| 8,108,262 B1 | 1/2012 | Thirumalai et al. |
| 8,280,824 B1 | 10/2012 | Vermeulen et al. |
| 8,332,260 B1 | 12/2012 | Mysen et al. |
| D678,904 S | 3/2013 | Phelan |
| D684,186 S | 6/2013 | Phelan |
| D695,763 S | 12/2013 | Tagliabue et al. |
| D696,270 S | 12/2013 | Hyunjung et al. |
| D696,274 S | 12/2013 | Tagliabue et al. |
| 8,645,190 B1 | 2/2014 | Juda et al. |
| 8,972,393 B1 | 3/2015 | Killalea et al. |
| D738,388 S | 9/2015 | Rosenberg et al. |
| D741,904 S | 10/2015 | Clement et al. |
| D743,998 S | 11/2015 | Auyeung |
| D744,001 S | 11/2015 | Orr |
| D747,731 S | 1/2016 | Oliveira |
| 9,311,390 B2 | 4/2016 | Higgins |
| 9,317,822 B2 | 4/2016 | Bohm et al. |
| D755,223 S | 5/2016 | Liu et al. |
| D756,383 S | 5/2016 | Makida et al. |
| D757,093 S | 5/2016 | Vonshak et al. |
| 9,342,226 B2 | 5/2016 | Brubaker |
| D759,070 S | 6/2016 | Heeter et al. |
| D760,247 S | 6/2016 | Oyama et al. |
| D760,253 S | 6/2016 | Heeter et al. |
| D763,911 S | 8/2016 | Choi et al. |
| D764,483 S | 8/2016 | Heinrich et al. |
| D766,312 S | 9/2016 | Hedges |
| 9,442,928 B2 | 9/2016 | Szues et al. |
| 9,679,001 B2 | 6/2017 | Kang |
| 9,792,658 B1 | 10/2017 | Vijendra et al. |
| 2001/0049648 A1 | 12/2001 | Naylor et al. |
| 2002/0004751 A1 | 1/2002 | Seki et al. |
| 2002/0099596 A1 | 7/2002 | Geraghty |
| 2003/0046684 A1 | 3/2003 | Weatherford |
| 2003/0101449 A1 | 5/2003 | Bentolila et al. |
| 2004/0015386 A1 | 1/2004 | Abe et al. |
| 2004/0064374 A1 | 4/2004 | Cho |
| 2005/0027700 A1 | 2/2005 | Turner et al. |
| 2005/0125364 A1 | 7/2005 | Edmondson et al. |
| 2005/0246321 A1 | 11/2005 | Mahadevan et al. |
| 2006/0020596 A1 | 1/2006 | Liu et al. |
| 2006/0143133 A1 | 6/2006 | Medvinsky |
| 2006/0282336 A1 | 12/2006 | Huang |
| 2007/0038567 A1 | 2/2007 | Allaire et al. |
| 2007/0038931 A1 | 2/2007 | Allaire et al. |
| 2007/0043615 A1 | 2/2007 | Dahleh et al. |
| 2007/0061363 A1 | 3/2007 | Ramer et al. |
| 2007/0203945 A1 | 8/2007 | Louw |
| 2008/0027827 A1 | 1/2008 | Eglen et al. |
| 2008/0154798 A1 | 6/2008 | Valz |
| 2008/0215507 A1 | 9/2008 | Eglen et al. |
| 2008/0263038 A1 | 10/2008 | Judge et al. |
| 2008/0263439 A1 | 10/2008 | Oz |
| 2008/0270309 A1 | 10/2008 | Brotman et al. |
| 2008/0307320 A1 | 12/2008 | Payne et al. |
| 2009/0076869 A1 | 3/2009 | Tazartes et al. |
| 2009/0099902 A1 | 4/2009 | Chatter et al. |
| 2009/0106730 A1 | 4/2009 | Mockford |
| 2009/0178073 A1 | 7/2009 | Tsuria et al. |
| 2009/0228379 A1 | 9/2009 | Honts et al. |
| 2009/0228574 A1 | 9/2009 | Maures |
| 2009/0240665 A1 | 9/2009 | Choi |
| 2009/0248575 A1 | 10/2009 | Dipl. Ing. Proidl et al. |
| 2009/0254447 A1 | 10/2009 | Blades |
| 2009/0292687 A1 | 11/2009 | Fan et al. |
| 2009/0300547 A1 | 12/2009 | Bates et al. |
| 2010/0017259 A1 | 1/2010 | Luo |
| 2010/0037248 A1 | 2/2010 | Lo et al. |
| 2010/0092095 A1 | 4/2010 | King et al. |
| 2010/0106587 A1 | 4/2010 | Walker et al. |
| 2010/0145814 A1 | 6/2010 | Maghani et al. |
| 2010/0205625 A1 | 8/2010 | Beyabani et al. |
| 2010/0241491 A1* | 9/2010 | Eglen .............. G06Q 30/0633 705/4 |
| 2010/0268716 A1 | 10/2010 | Degaugue et al. |
| 2011/0055018 A1 | 3/2011 | Valz |
| 2011/0082703 A1 | 4/2011 | Higbie |
| 2011/0082761 A1 | 4/2011 | Eglen et al. |
| 2011/0106807 A1 | 5/2011 | Srihari et al. |
| 2011/0119104 A1 | 5/2011 | Levine et al. |
| 2011/0154174 A1 | 6/2011 | Liu et al. |
| 2011/0161997 A1 | 6/2011 | Rourk |
| 2011/0314051 A1 | 12/2011 | Cavet et al. |
| 2011/0321072 A1 | 12/2011 | Patterson et al. |
| 2012/0137367 A1 | 5/2012 | Dupont et al. |
| 2012/0185892 A1 | 7/2012 | Camplejohn et al. |
| 2012/0238255 A1* | 9/2012 | Ramer ............. H04L 67/2828 455/414.2 |
| 2012/0284290 A1 | 11/2012 | Keebler et al. |
| 2012/0290950 A1 | 11/2012 | Rapaport et al. |
| 2012/0303418 A1 | 11/2012 | Poreh |
| 2012/0331049 A1 | 12/2012 | Deeter et al. |
| 2013/0031487 A1 | 1/2013 | Olsen et al. |
| 2013/0144723 A1 | 6/2013 | Green et al. |
| 2013/0173408 A1 | 7/2013 | Lindblom |
| 2013/0246207 A1 | 9/2013 | Novak |
| 2013/0282596 A1* | 10/2013 | Fleming .............. G06Q 50/16 705/306 |
| 2013/0305357 A1 | 11/2013 | Ayyagari et al. |
| 2013/0311181 A1 | 11/2013 | Bachtiger et al. |
| 2014/0130182 A1 | 5/2014 | Yackanich et al. |
| 2014/0344034 A1 | 11/2014 | Goodman et al. |
| 2014/0344186 A1 | 11/2014 | Nadler |
| 2015/0193798 A1 | 7/2015 | Poreh |
| 2015/0206112 A1 | 7/2015 | Poreh |
| 2015/0206160 A1 | 7/2015 | Poreh |
| 2015/0206161 A1 | 7/2015 | Poreh |
| 2015/0221002 A1 | 8/2015 | Poreh |
| 2015/0227953 A1 | 8/2015 | Poreh |
| 2015/0248222 A1 | 9/2015 | Stickler et al. |
| 2015/0254565 A1 | 9/2015 | Beigman Klebanov et al. |
| 2015/0256675 A1 | 9/2015 | Sri et al. |
| 2015/0294337 A1 | 10/2015 | Poreh |
| 2015/0339692 A1 | 11/2015 | Poreh |
| 2015/0339693 A1 | 11/2015 | Poreh |
| 2015/0346923 A1 | 12/2015 | Conder |
| 2016/0027074 A1 | 1/2016 | Poreh |
| 2016/0117059 A1 | 4/2016 | Folken et al. |
| 2017/0017977 A1 | 1/2017 | Herriger et al. |
| 2017/0177590 A1 | 6/2017 | Akselrud |
| 2017/0286934 A1 | 10/2017 | Poreh et al. |

FOREIGN PATENT DOCUMENTS

| | | |
|---|---|---|
| WO | 2001039086 A2 | 5/2001 |
| WO | 0210961 A2 | 2/2002 |
| WO | 2011097739 A1 | 8/2011 |
| WO | 2012162387 A1 | 11/2012 |
| WO | 2014026057 A2 | 2/2014 |
| WO | 2014026058 A1 | 2/2014 |
| WO | 2014026059 A2 | 2/2014 |
| WO | 2014026060 A2 | 2/2014 |
| WO | 2014026061 A1 | 2/2014 |
| WO | 2014026062 A2 | 2/2014 |
| WO | 2014026063 A1 | 2/2014 |
| WO | 2014026064 A2 | 2/2014 |
| WO | 2015179716 A1 | 11/2015 |
| WO | 2015179717 A1 | 11/2015 |
| WO | 2016015004 A1 | 1/2016 |

OTHER PUBLICATIONS

International Search Report and Written Opinion in International Patent Application No. PCT/US2015/032085, filed May 21, 2015.

(56) References Cited

OTHER PUBLICATIONS

International Search Report and Written Opinion in International Application No. PCT/US2012/039129, dated Sep. 24, 2012.
Jagannathan, S. (2003). Pricing considerations for delivering e-content on-demand. (Order No. 3093547, University of California, Santa Barbara). ProQuest Dissertations and Theses, 1-191 pg.
Gibson, O. (Jul. 29, 2002). Media: Pay and display: Would you buy a website clip of madonna in concert? Content providers think so—but do you really trust them with your money? The Guardian.
International Search Report and Written Opinion for International Patent Application No. PCT/US2015/032084, filed May 21, 2015, 10 pages.
International Search Report and Written Opinion in International Patent Application No. PCT/US2015/042102, filed Jul. 24, 2015, 11 pages.
Trademark Serial No. 86263848, Apr. 26, 2014 (filing date), (Registrant) Acupic Software Corporation Corporation Bahamas, Trademark Electronic Service System (TESS).
Trademark Registration No. 1758709, Mar. 16, 1993 (registration date), First used in commerce—Nov. 1, 1990, (Registrant) Connecticut Specialty Insurance Group, Inc. Corporation Connecticut, Trademark Electronic Service System (TESS).
Trademark Serial No. 74075783, Jul. 3, 1990 (filing date), (Applicant) Toshiba Ceramics Co., Ltd. Corporation Japan, Trademark Electronic Service System (TESS).
Trademark Registration No. 1584443, Dec. 5, 1989 (registration date), First used in commerce—Nov. 1985, (Registrant) Control Systems, Inc. Corporation Minnesota, Trademark Electronic Service System (TESS).
Trademark Registration No. 1273388, Apr. 10, 1984 (registraion date), First used in commerce—Sep. 15, 1982, (Registrant) Goal Systems International Inc. Corporation Ohio, Trademark Electronic Service System (TESS).
7th Grade Math 2015-2016, posted on Sep. 9, 2015, © 1999-2016 Google (online), [site visited Sep. 13, 2016], Available from Internet, <URL: http://7thgrademath2015-2016.blogspot.com/2015/09/investigation-11-shapes-and-designs.html>.
Elegant Themes | Gallery | Foxy Theme Readme, posted on Apr. 12, 2013, © 2016 Elegant Themes [online], [site visited Jun. 23, 2016]. Available from Internet, <URL: http://www.elegantthemes.com/gallery/foxy/readme.html>.
Trademark Serial No. 87013005, Apr. 25, 2016 (filing date), (Applicant) QBEATS Inc. Corporation Delaware, Trademark Electronic Service System (TESS).
Trademark Registration No. 0737125, Sep. 4, 1962 (registration date), First used in commerce—Oct. 29, 1961, (Registrant) Butler Bin Company Corporation Wisconsin, Trademark Electronic System (TESS).
Jagannathan et al., "A dynamic pricing scheme for e-content at multiple levels-of-service.", Aug. 8, 2003 (Aug. 8, 2003) In: Computer Communications 27. Retrieved on Dec. 11, 2013 (Dec. 11, 2013) from <http://www.nmsl.cs.ucsb.edu/papers/COMCOM-04a.pdf>.
Lobst et al., Are Journals Cost Effective? Subscriptions to Electronic Full Text Versus Pay-Per-View. Lehigh Valley Health Network. Oct. 2009. [Retrieved on: Dec. 15, 2013]. Retrieved from internet: <URL: http://scholarlyworks.lvhn.org/cgi/viewcontent.cgi?article=1022&context=education>.
EBay. eBay Stores: Subscriptions & Fees. eBay. May 2012. [Retrieved on: Dec. 16, 2013]. Retrieved from Internet: <URL: http://web.archive.org/web/20120503002057/http://pages.ebay.com/storefronts/subscriptions.html>.
Art of Problem Solving | Community | 2012 AMC 12/AHSME, posted on Feb. 23, 2012, © Mathematical Association of America [online], [site visited Sep. 21, 2016]. Available from Internet, <URL: http://www.artofproblemsolving.com/commmunity/c4876_2012_amc_12ahsme>.
Logo Quiz Game | Levels | Logos Quiz Level 1 Answers, posted on Jan. 31, 2015, no copyright date posted [online], [site visited Sep. 21, 2016]. Available from Internet, <URL: http://logoquizgame-answers.com/level-1/>.
Trademark Registration No. 3669519, Aug. 18, 2009 (registration date), (Registrant) Inducs AG Société anonyme Switzerland, Trademark Electronic Service System (TESS).
Trademark Registration No. 4181386, Nov. 27, 2012 (registration date), First used in commerce—Jun. 15, 2014, ) Registrant) Clarke, Janet DBA Certifiable Derby Training Individual, USA Arizona, Trademark Electronic Service System (TESS).
Trademark Registration No. 3813143, Jul. 6, 2010 (registration date), First used in commerce—Jul. 11, 2009, (Registrant) Abest Products Resourcing Inc. Corporation Taiwan, Trademark Electronic Service System (TESS).
Trademark Serial No. 85265839, Mar. 14, 2011 (filing date), (Applicant) Nucap Industries Inc. Corporation Sanada, Trademark Electronic Service System (TESS).
Trademark Registration No. 4450437, Dec. 17, 2013 (registration date), First used in commerce—Jan. 2013, (Registrant) Reservoir Media Management, Inc. Corporation Delaware, Trademark Electronic Service System (TESS).

\* cited by examiner

EXTERNAL APPLICATIONS

Text Analyzer

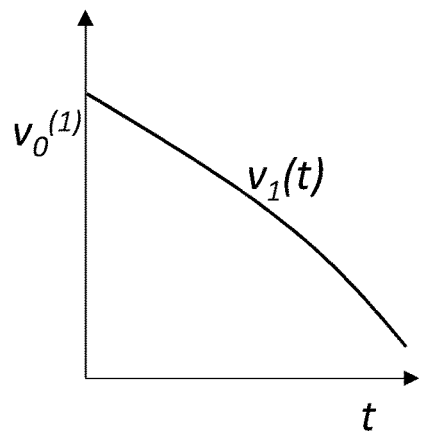
Fig. 4a Valuation Function for $d_1$
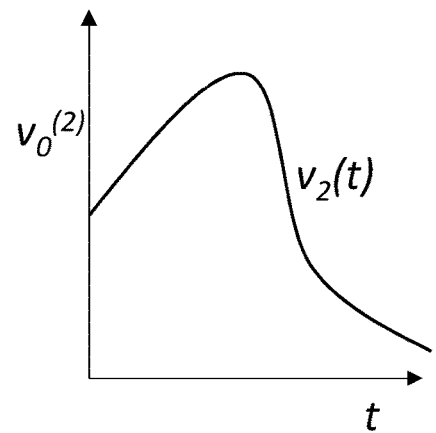
Fig. 4b Valuation Function for $d_2$
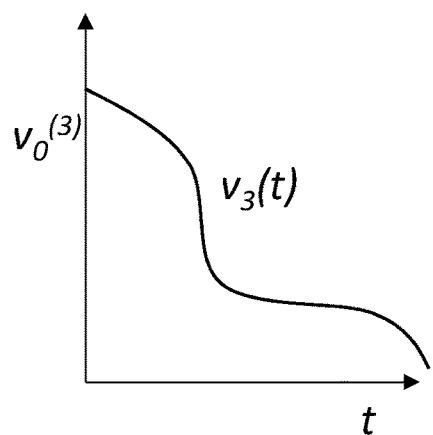
Fig. 4c Valuation Function for $d_3$
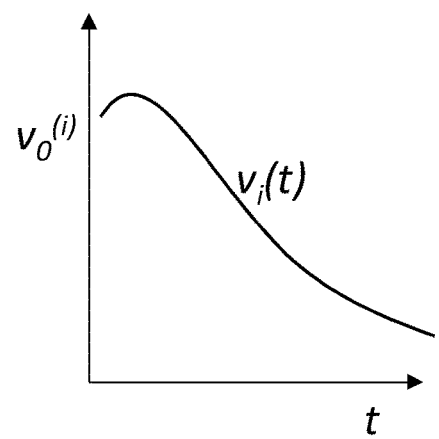
Fig. 4d Valuation Function for $d_i$

320

S510

For each of documents $d_1 \ldots d_m$ from Stories DB 110.
- Extract Characteristics
- Transform to Atributes:
$w_1, \ldots w_n$ - positive real numbers $\in [0,1]$

522

S512

Map a function for each $d_i$ to for <u>weighted vector representations</u>
$d_i \underline{\Psi} (w_1^{(i)}, \ldots w_n^{(i)})$
and store in association with respective documents $d_1 \ldots d_m$

S514

Define a function to measure local/coordinate similarity $\sigma_k(d_i, d_j) = |w_k^{(i)}, w_k^{(j)}| \in [0,1]$

S516

Ranking documents $d_1 \ldots d_m$ in relation to their closeness to document $d_{m+1}$

Fig. 5b

Forming Similarity Models for each story

Pricing

SELF-LEARNING VALUATION

CROSS-REFERENCE TO RELATED APPLICATIONS

This application claims priority to U.S. Provisional Patent Application Ser. No. 62/304,836, entitled "SELF-LEARNING VALUATION" and filed Mar. 7, 2016, the disclosure of which is incorporated herein by reference in its entirety.

FIELD OF INVENTION

The present system relates to valuation of digital content items and more particularly on pricing of digital content items based on willingness of consumers to pay for the items and on historical prices of similar items.

BACKGROUND OF INVENTION

A wide variety of digital content is accessible via the Internet. Such content includes, for example, news articles, blogs, tweets, images, chats and the like. Daily increases in the subject matter and amount of this content is immense. The digital content in its various formats is provided by online publishers, such as, magazines, newspapers, periodicals, databases, and news and other information services. For a vast majority of these publications the content is provided free of charge or by paid subscription. This makes it difficult if not impossible to sell individual articles or charge premium for articles describing sought after subject matter or written by sought after authors, etc. Thus, consumers interested in articles in a specific subject, e.g., election coverage, sports or technology, from diverse sources are required to purchase monthly subscriptions to full publications, e.g., the New York Times, the Washington Post, the Wall Street Journal, etc. to satisfy their interests. Alternatively, non-premium articles on the same topics may be sought and obtained for free from online services like Yahoo and Google News. However, currently discrete premium content articles are not being sold online for a fee other than a full subscription to the publication.

On the other hand, if digital content items, such as news or sports articles, are made available for sale individually, valuation of such content is difficult. Apple's iTunes store is an example of a marketplace where digital content items are sold. iTunes subdivides songs on a recorded music album into individual songs and sells the songs individually instead of together as an album. Pricing such songs dynamically based on demand has not been achieved despite the fact that dynamic pricing is sure to maximize profits for the song owners. iTunes prices the individual songs statically in four price categories. Thus, the price of even the most sought after songs cannot be increased beyond the price of the highest category or lowered dynamically when the demand diminishes. This makes it difficult to maximize profits through price adjustments.

The drawbacks of static pricing are in that the consumers' interest is dynamic. It may fluctuate due to factors external to the consumers. For example, a rainy day may increase the demand for the transportation services because more people use cabs when it rains. This causes the availability of the service to become scarcer and its value to the consumers to rise. A patent application Ser. No. 13/828,481, dubbed "surge pricing", filed by Uber Technologies Inc., describes a computer-based application for connecting consumers and transportation services. It discusses adjusting prices for the transportation services due to changes in external conditions by determining an amount of service requesters and an amount of available service providers at a given time and adjusting a price relative to a default price for the service based on the amount of service requesters.

The drawback of the referenced "surge pricing" patent application is in that it addresses transportation services that are physically restricted, i.e., there is a limited number of service providers, i.e., drivers. Thus, such scheme will not apply to sales of digital content items. A significant feature that distinguishes physical goods and services and digital items is in that digital items may be duplicated without limitation thus notions of economical scarcity do not apply to them. Of course, there may very well be legal restrictions, such as licensing agreements, digital rights management (DRM), and copyrights, placed on such duplication. However, for this document it is assumed that these restrictions do not apply.

It is further noted that in addition to making cabs scarce, a rainy day may influence the consumers not to mind dynamic upward adjustments to the price and to listen to sad or nostalgic music. Of course, the reverse is also true. On a sunny day cabs become more plentiful as the demand for transportation decreases with consumers strolling to their destinations. Thus, prices for cabs and genres of songs should be adjusted dynamically to reflect the present interest of the consumers.

Many events may influence consumers' interest. For example, when news of a future release of the latest Star Wars movie was announced, the consumers' interest in all things related to the Star Wars saga, i.e., toys, games, books, articles, discussions, preview clips, has increased dramatically not only for the new content but also for the pre-existing content. It follows that an objective market value of the content items related to Star Wars, was at its maximum price or very close to it.

In addition, it is observed that a value of an item is a range determined by interests of sellers and consumers. The lower bound of the range is a minimum price, below which a sale becomes unprofitable and, thus, unacceptable to the sellers. The upper bound of the value range is a maximum price above which the consumers are not interested in making the purchase. Thus, what is needed is a way to dynamically correct the price within the range to maximize profits.

SUMMARY OF INVENTION

It is an object of this invention to provide a method and a system for dynamically varying prices of digital content to maximize profits from sale of the item.

The present system enables pricing, offering for sale, and purchasing of individual digital content items, which maybe news articles or stories of various interests. Each content item is identifiable by attributes, which are ascertained from the content itself, see discussion of text analysis below. Two types of attributes are used, attributes that are generic for all classes/domains and attributes that are specific to each class/domain. Thus, the generic attributes are used to ascertain classes/domains of the content items, e.g., human interest, politics, sport, funny, serious, a scoop, a rumor, etc. For example, attributes of an article about American football will identifying it as being about sport. The specific attributes may include ratings of players or teams mentioned in the text.

The selling or consuming of the content items is achieved when the consumers pay or watch one or more advertisements fashioned to reflect the monetary value of the content items. The pricing part, i.e., determining and setting the monetary value of the content items is achieved by (1) Assigning to each content, item a valuation function to calculate the value/price of the content item at any point during the content item's lifetime; and (2) Adapting the assigned valuation function over the lifetime of its content item (starting at an initial offer for sale to an end of sales cycle) in accordance with market response, i.e., purchases and/or lack of purchases, which makes the adapted valuation function unique to the content item and its specific lifetime.

The valuation functions are assigned to the new content items as follows:

a. Closest one or more previously processed content items are determined based on similarity of their attributes with attributes of the new content item and ranked; and Using weighted averaging, the adapted valuation functions corresponding to the ranked one or more previously processed content items are averaged. Prior to weighted averaging the adapted valuation functions may also be normalized, because their lifetimes may be different, e.g., 30 minutes, 24 hours, 3 weeks, etc.;

b. Otherwise, when closest one or more previously processed content items do not exist, a copy of a default valuation function closest to the attributes of the new content item is used. The default valuation functions may be defined by experts most familiar with consumer behavior related to consumption of stories in the various classes/domains and the lifetime or sustainability of the consumption. For example, experts in on-line sales of various types of literature, familiar with price premiums placed on various authors and literary genres, may be considered fit to formulate the default valuation functions for poems.

Alternatively, on the off chance that the expert prepared default valuation function that corresponds to the attributes of the new content item does not exist, a new valuation function will be established by setting an initial value using, for example, an "edge cutting" adaptation method, and trained by adaptation to market response, both adaptation method will be discussed below.

Provided is a method and a system of valuating a plurality of digital content items and offering the valuated plurality of digital content items for sale to consumers on devices connected to a network, the method including: on a processor connected to the network receiving the plurality of digital content items; for each received content item: establishing a plurality of attributes from content and characteristics of the content item; establishing a lifetime indicating span of consumers interest in the content item; producing a valuation function for calculating a market value of the content item during its lifetime by finding and ranking nearest one or more previously processed content items having the plurality of attributes with closest similarity to the plurality of attributes of the received content item, performing weighted averaging of the valuation functions produced for the nearest one or more of the previously processed content items; and adapting, using an "edge cutting" approach, the produced valuation function to a market response reflecting behavior of the consumers in response to the market values of the content item calculated by the valuation function.

BRIEF DESCRIPTION OF DRAWINGS

The invention is explained in further detail, and by way of example, with reference to the accompanying drawings wherein:

FIGS. 4a, 4b, and 4c are diagrams illustrating different valuation functions for three different documents or stories in accordance with the present system;

FIG. 4d is a diagram illustrating a valuation function for a new story that is calculated based on valuation functions of FIGS. 4a, 4b, and 4c in accordance with the present system;

FIG. 5b is a flowchart diagram illustrating steps performed by Similarity Modeler of FIG. 5a in accordance with the present system;

DETAILED DESCRIPTION OF INVENTION

The following is a description of illustrative embodiments that when taken in conjunction with the following drawings will demonstrate the above noted features and advantages, as well as further ones. In the description, for purposes of explanation rather than limitation, illustrative details are set forth such as architecture, interfaces, techniques, element attributes, etc. However, it will be apparent to those of ordinary skill in the art that other embodiments that depart from these details would still be understood to be within the scope of the appended claims. Moreover, for the purpose of clarity, detailed descriptions of well-known devices, tools, techniques and methods are omitted so as not to obscure the description of the present system. It should be expressly understood that the drawings are included for illustrative purposes and do not represent the scope of the present system. In the accompanying drawings, like reference numbers in different drawings may designate similar elements.

Figure 1:
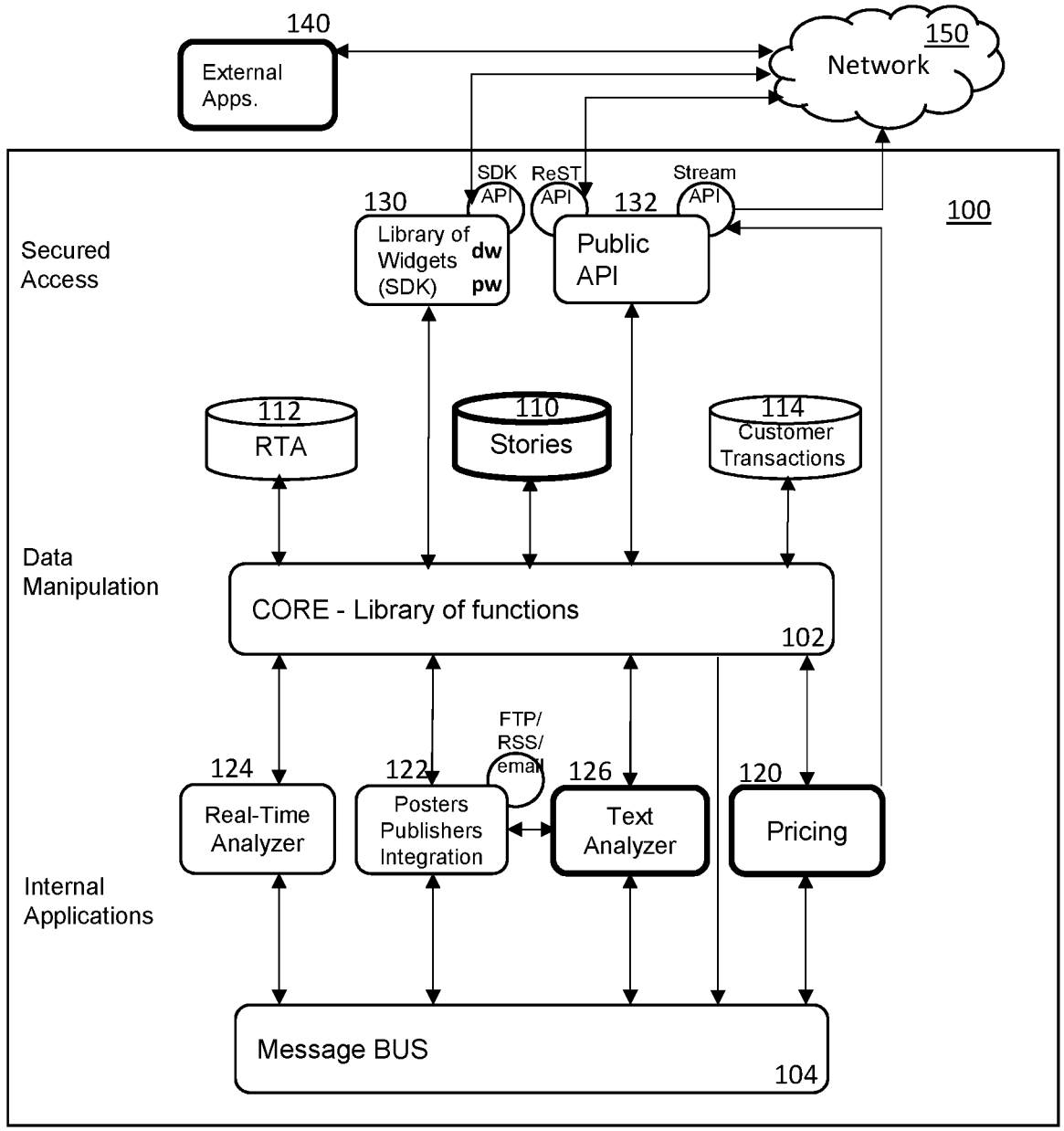
FIG. 1 is a diagram illustrating processing and database components in accordance with the present system.

FIG. 1 illustrates network 150, e.g., the Internet, to which online External Applications 140 supporting consumer applications of the inventive system and server system 100 are connected. Server system 100 includes three logically arranged layers including Secured Access, Data Manipulation, and Internal Applications. The logically arranged layers are discussed here only for clarity of this description and the discussed separations of modules and databases are not required.

The Secured Access layer of server system 100 includes application program interface (API) for External Applications called Public API 132, which enables secure reception of digital content and other information via network 150. The Secured Access layer further includes software development kit (SDK) API 130 for securely supporting and delivering, e.g., below described code snippets, to External Applications 140.

Figure 2A:
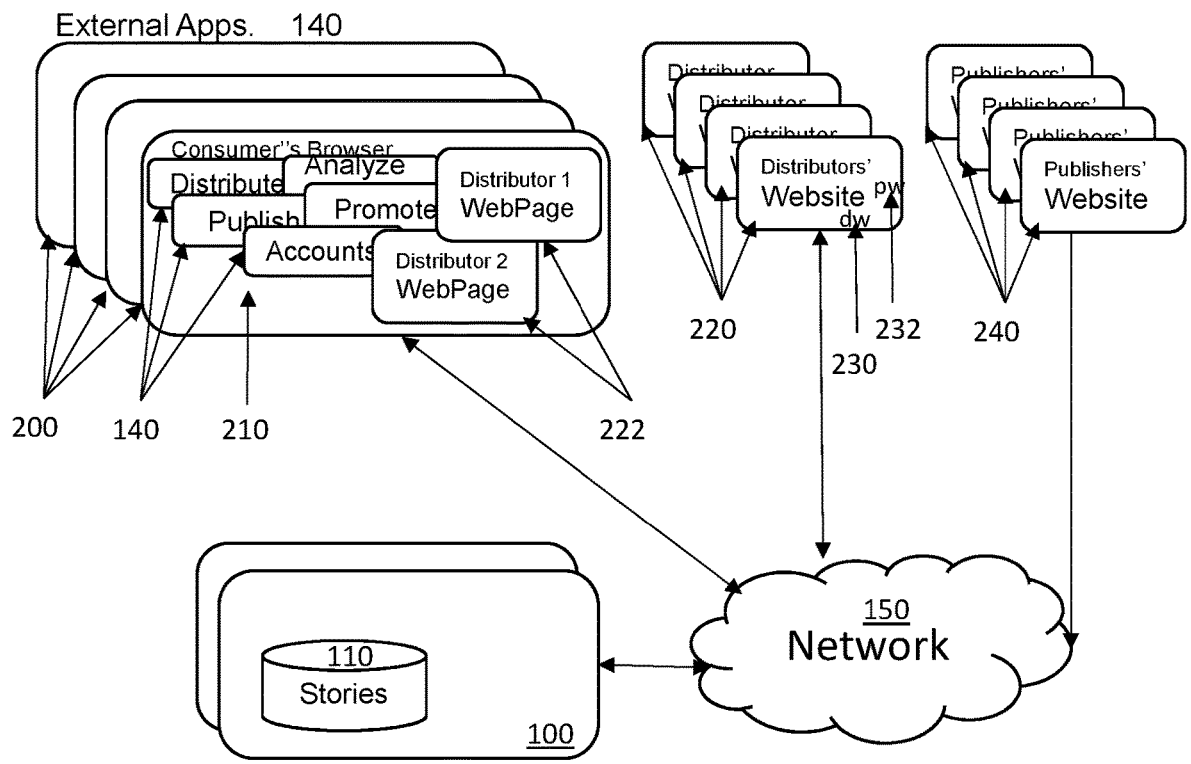
FIG. 2a is a diagram illustrating general connectivity of external applications and internal processing and database components in accordance with the present system.
Figure 2B:
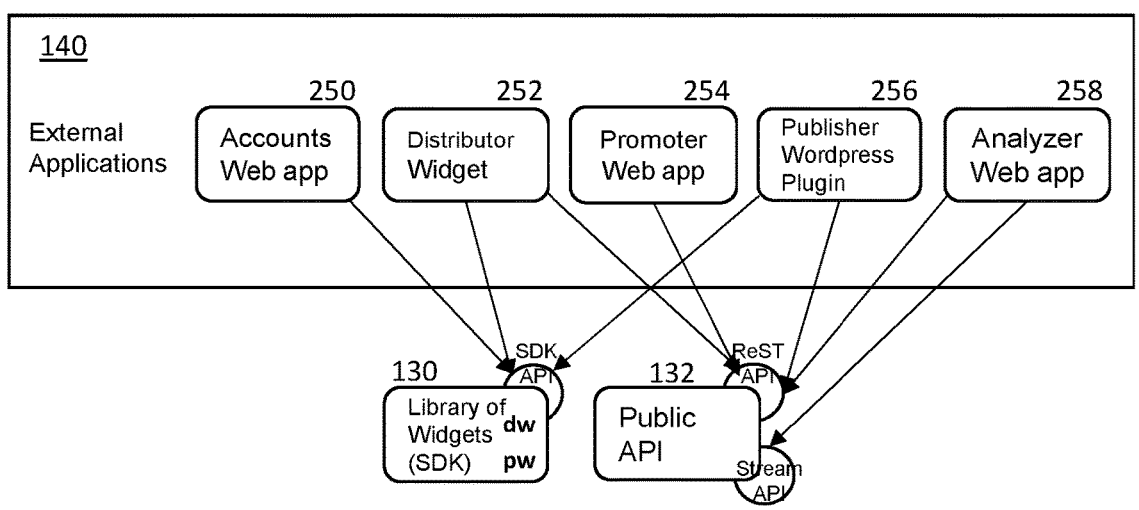
FIG. 2b is a diagram illustrating specific connectivity of external applications to a Secure Access layer in accordance with the present system.

As illustrated in FIGS. 2a and 2b, External Applications 140 are executed by consumers using network browsing programs 210 on computing devices 200, e.g., computers, tablets, mobile devices, cell phones, etc., that are connected to network 150. Further, digital content items, which will be alternatively referred to as documents, stories, and articles, are provided to system 100 from websites and databases of content distributors 220, which may be also connected to network 150. Likewise, system 100 processes and calculates dynamic prices for the received digital content items and distributes the respective prices for display to consumers on webpages 222 on consumers' browsers 210. The webpages 222 are reflective of the digital content items on the respective distributors' websites 220. Exemplary applications of External Applications 140 may comprise the following:

a. Accounts application 250, for enabling consumers to register with system 100, i.e., open and maintain on-line accounts that enables purchase of credit, and subsequent use of the credit to purchase and access the content from webpages 222 displayed on computing devices 200.

b. Distribute application 252, for enabling formulation of online computer software, referred to above as code snippets and maintained in Library of Widgets 130. One of the code snippets, called Display Widget (DW) 230 is used for receipt and display of dynamic prices from system 100, and is custom crafted for each distributor's website 220 in accordance with the registered consumer/distributor's requirements provided to Distributor application 252. Such requirements may include filters describing content favored for or inhibited from distribution, feeds from which the content is favored or inhibited for distribution. The formed code snippet may be placed on the registered consumer/distributor's website 220.

Another code snippet called Purchase Widget (PW) 232, is used for enabling consumers making a purchase of content, a choice between making a payment with their previously purchased credit and making the payment by watching one or more advertisements. The code snippets are loaded onto the distributor's website 220 for subsequent distribution to consumers' browsers 210 within webpages 240.

c. Promoter application 254, for enabling sponsors to select subject matter of or specific content items, which they are willing to sponsor and to specify price ranges at which they are willing to sponsor the selected subject matter. The sponsors are then enabled to provide links to the advertisements that they want to be seen by the consumers of the content. In addition, the sponsors can select authors, companies, and other parameters for positive and/or negative treatment, i.e., inclusion or exclusion from sponsorship.

d. Publisher application 256, for enabling registered consumers/publishers connected to system 100 via network 150 from computing devices 200 to author new articles and/or authorize conveyance of numerous content items to system 100, where these content items will be analyzed, dynamically priced and offered for sale on distributor's websites 220. The registered consumers/publishers such as seasoned journalists, groups of journalists, journalists' or writers' representatives or employers, e.g., newspapers, magazines, or online distributors may have existing digital content items, which can be directed to system 100, e.g., via (Representational State Transfer) ReST API of Public API 132.

e. Analyzer application 258 enables consumers/publishers to analyze behavior of, and other information about the published stories, e.g., how often each story is purchased, at what price, in what geographic location, by whom, etc., this analysis will be further described below.

Additional External Applications 140 are provided, e.g., to enable individual consumers to contribute or write original content items, such as opinion articles and offer them for sale, using software plugins, e.g., open-source content management system like WordPress, that enables composition of a text story and inclusion of media files. In this case, the consumers/writers will be asked to provide a synopsis; profiles of websites on which the article should or should not be published; and a proposed lifetime for the article and optionally at least a minimum price below which the article should not be sold. Moreover, the text of the original content items may be analyzed, in a manner described below, to identify keywords on which basis attributes are established. The attributes express the content items' class/domain and other characteristics.

Returning now to FIG. 1, server system 100 further includes a Data Manipulation layer comprising Core module 102 and databases described below, some of which are managed, supported, and accessed using a comprehensive collection of library functions comprised in Core module 102. Processing calls requesting execution of these library functions are made from blocks in Internal Applications layer, which communicate with one another and Core module 102 via bus 104.

The databases in the Data Manipulation layer include at least Stories database 110, real time analysis (RTA) database 112, and Customer Transactions database 114. Stories database 110 comprises text based as well as non-text content items, e.g., audio, video, images, software, mixed media, etc., and respective metadata received, as discussed above from External Applications 140 and content distributors. RTA database 112 stores information regarding the published stories and purchases made by the consumers, i.e., what stories were purchased, when, and for how much. This information is also called clicks because purchases over the Internet are made on computers using mouse devices to make clicks indicating purchases. Customer Transactions database 114 records activities performed by the registered consumers engaging with External Applications 140, e.g., activities relating to registration, purchase of credit, authoring of stories to be added to Stories database 110, purchase of access to stories and other. Additional databases are discussed below.

It is understood by these skilled in the art that while in this description the textual and non-textual content is described as being managed in a single database, for speed and/or ease of access separate databases may be used specifically for separating text based and media content.

The Internal Applications layer includes Integrations block 122, which manages integration of the content items received, as discussed above, from Publishers' 240 (FIG. 2a), e.g., via feeds in various formats including file transfer protocol (FTP) and Rich Site Summary (RSS) formats and/or via email, into Stories database 110. The content of each of the received content items is processed by Text Analyzer 126 to identify the keywords that are used to define attributes. The attributes may then be used to express the content items' class/domain. Valuation Analyzer 120 derives dynamic, objective market value (price) for the valuation functions of the respective content items for the duration of the lifetimes, i.e., period during which the content item is offered for sale.

Moreover, at predetermined intervals and/or upon request, Valuation Analyzer 120 streams the dynamic prices in real-time via streaming API of Public API 132 to network 150. In addition, as stated above, Valuation Analyzer 120 processes content entered by the registered consumer in Publish Application 256.

As discussed, upon receipt at the Distributors' websites 220 (FIG. 2*a*), the price is displayed by online computer software DW 230 (FIG. 2*a*) on External Applications 140 as an offer to sell access to the digital content. Purchase of the content is achieved through online computer software code snippets PW 232 (FIG. 2*a*), which offers consumers a choice between making a payment in currency or by watching an advertisement. When PW determines that either payment option is completed, access to the purchased content is enabled.

The Internal Applications layer further includes RTA block 124 that monitors relevant event transactions on message bus 104 and when such event transactions are detected, they are recorded in RTA database 112. As mentioned, RTA block 124 also processes events communicated by Analyze Application 258 (FIG. 2*b*). All events and transactions affecting respective stories that are processed by RTA block 124 are stored in RTA database 112.

It will be clear to these skilled in the art that Stories and RTA databases 110 and 112 are document-oriented databases, so database packages such as MongoDB, Cassandra, and HBase, for example, can be used for their implementation. For consumers' transactions database 114 a Structured Query Language (SQL) database may be used.

Text Analyzer

As discussed above with reference to External Applications 140, the digital content items comprise characteristics of varying importance or significance with respect to the objective market value of the content item. This importance or significance is uncovered from the content by Text Analyzer 126, which analyzes the text by identifying keywords; ascertaining their significance; and establishing a vector of numeric representations or attributes corresponding to the keywords. For example, given the following three content items: (1) "Kim Kardashian falls on entering court, hurts leg", Ms. Kardashian is a Television personality; (2) "Lebron James falls on entering court, hurts leg", Mr. James is a star basketball player of Cleveland Cavaliers; and (3) "Tyronn Lue falls on entering court, hurts leg", Mr. Lue is a head coach of Cleveland Cavaliers.

Given the following: (1) celebrities and their areas of prominence are known and well documented; (2) the areas of prominence may be mapped to known classes/domains, e.g., Human Interest, Sports, etc.; and (3) some celebrities are more famous or notorious than others, which fame and notoriety can be ranked for each of the classes/domains. The ranking is performed by experts, such as, gossip columnists and sport writers, in accordance with interest that the celebrities elicit in the respective consumers. Thus, the word combinations "Kim Kardashian", "Lebron James", and "Tyronn Lue" will be interpreted as keywords and attributes having numerical values corresponding to the celebrity rating are established identifying the first content item a Human Interest story and the second and third as Sports related stories.

As with regard to the word combination "hurts leg", this keyword gives rise to establishment of an attribute having a numeric value, which may be derived from an expert built table indicating a significance of an injury to a specific part of a body within the class/domain and an importance of this injury on eliciting interest of the readers or consumers of the content. In the present example, it is evident that a story about a leg injury of a highly ranked basketball player will have more impact and garner more interest than a story about a highly ranked coach having the same injury. That is because coaches' excellence usually does not depend on the use of their legs.

Table 1 illustrates the attribute vector of the above example. The determination of reference in the text to "Kim Kardashian" nets "7" in the celebrity field 4 and "15" the injury related field 8 of the attribute vector while "Lebron James" and "Tyronn Lue" both receive "17" in the celebrity field 4 and "113" in the injury related field 8 to respectively indicate Human Interest and Sports stories. In addition, the attributes are weighted by the importance assigned to the level of celebrity notoriety and the effect of the injury suffered on the interest of the consumers or readers of the content. The weight numbers are decided and dynamically updated by experts, e.g., gossip columnists and sports writers. Accordingly, as shown below with illustrative fields, values and weights, the weight of Mr. James' celebrity and of his injury are higher than these of Mr. Lue's. Therefore, the content item discussing Mr. James will be given appropriately higher valuation.

TABLE 1

| 0 | 1 | 2 | 3 | 4 | 5 | 6 | 7 | 8 | 9 | 10 | ... Domain |
|---|---|---|---|---|---|---|---|---|---|---|---|
|   |   |   |   | 7 |   |   |   | 15 |   |   | ... Human Interest "Kim Kardashian" |
|   |   |   |   | 0.45 |   |   |   | 0.10 |   |   | ... Weights |
|   |   |   |   | 17 |   |   |   | 113 |   |   | ... Sports "Lebron James" |
|   |   |   |   | 0.67 |   |   |   | 0.75 |   |   | ... Weights |
|   |   |   |   | 17 |   |   |   | 113 |   |   | ... Sports "Tyronn Lue" |
|   |   |   |   | 0.20 |   |   |   | 0.30 |   |   | ... Weights |
|   |   |   |   |   |   |   |   |   |   |   | ... |

Figure 3:
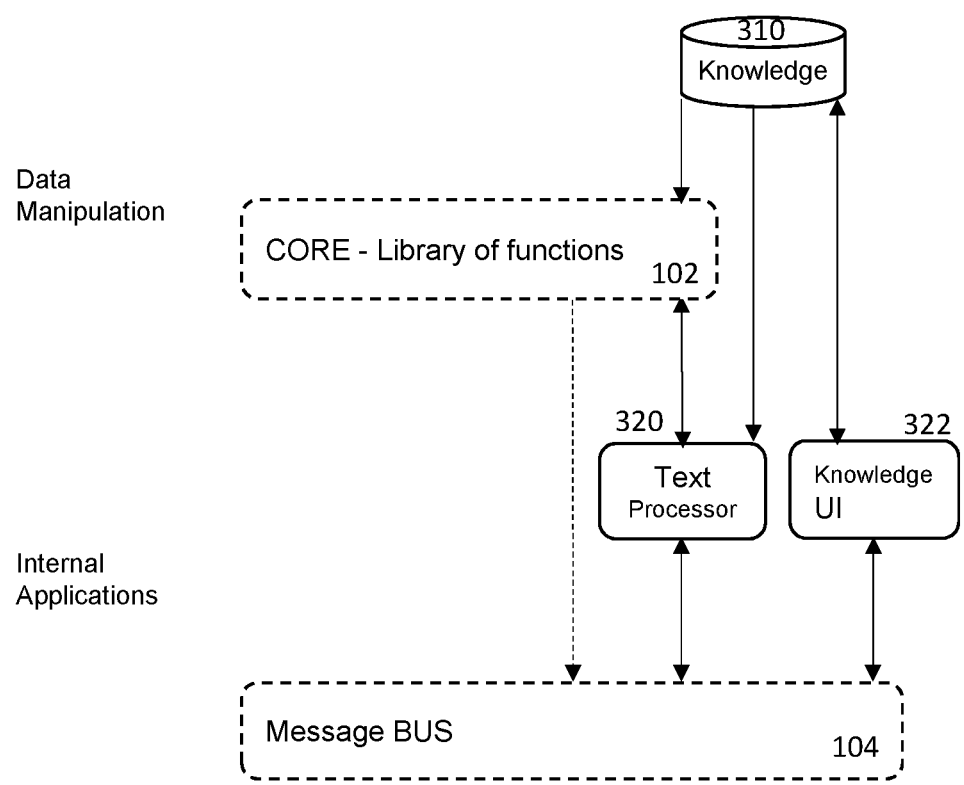
FIG. 3 is a diagram illustrating Text Analyzer in accordance with the present system.

As illustrated in FIG. 3, Text Analyzer 126 performs the discussed analysis using Text Processor 320, Knowledge User Interface (UI) 322 and Knowledge database 310, which comprises descriptions of various contextual importance of words and combinations or relationships of words. Text Processor 320 analyzes stories from Stories database 110 (FIG. 1), e.g., by ascertaining keywords in their text. In a non-limiting way the keywords may identify (1) a genre of the content of the story; (2) presence of visual aids in the content; (3) extent of access/distribution or how wide is the story's reach; (4) entities mentioned within the content; (5)

importance of repeated words; (6) ranking of the content's publisher; (7) geography of target audience of the content; (8) geography of the author; (9) date and time of publication; (10) uniqueness of the content. On the basis of thus identified keywords, the story's attributes are determined. From the attributes, the story's class/domain and other characteristics are ascertained.

In one exemplary embodiment, analysis may be performed using, e.g., Natural language Processing (NLP). For example, using NLP, language in which the document is written can be identified, length of the document can be determined, entities named in the document may be recognized using techniques called named entity recognition (NER), e.g., people's names, relationships between the named entities can be ascertained, sentiment expressed in the document can be made known.

The classes/domains of the stories, e.g., Financial News, may be identified using news codes provided by International Press Telecommunications Council (IPTC). Discussion of IPTC news codes may be found on-line, specifically on iptc.org and generally on Wikipedia.com. The story is identified as news when the story's attributes indicate its belonging to a group of stories identified with one of the IPTC news codes. For example, as listed in "iptc.org/standards/news codes/groups", stories or articles may be classified by all of Genre; Media Topic; Scene; Subject Code, etc., where Subject Code in particular includes of 1400 terms or keywords organized in three hierarchical levels. Thus, in accordance with IPTC, a. Genre of the story may be determined to be: Background, Biography, Current, Exclusive, Feature, Interview, Opinion, Press Release, Profile, Review, Uprate, etc.
b. Media Topic of the story may be determined to be: Crime, where focus is on one of the players involved in criminal activity; Health, e.g., the focus is on head injury in Football; Sports; and Weather, e.g., when rain or snow are forecast on the day of the game.
c. Scene of the story may be determined to be: reflecting various numbers of subjects in the images in the content of the story, e.g., number of players in the image, if the image is of action or close-up, etc. may be identified.
d. Subject Code of the story, (if the Media Topic of the story was determined as Sport) may be determined to be: American Football Conference (AFC) and National Football Conference (NFC) and east, west, north and south divisions within each of the conferences.

Knowledge database 310 may also comprise information about contemporaneous and pending events, ratings of various entities and other inputs from various sources that describe correspondence or relationship between the keywords in the story being analyzed. The ratings may comprise, e.g., current and past rankings of various sports teams and individual team members, i.e., players and coaches. These relationships may identify further attributes and indicate weights for the attributes, i.e., higher ranked team and higher ranked player may be of greater importance. Stories having the attributes identifying higher ranked team or player, will have heavier weights and, thus, be priced accordingly.

As with regard to events, Knowledge database 310 comprises rules describing the importance of the various events. For example, a story about a ball game taking place in a large media market, or an event relating to teams followed by affluent audiences may be given more weight because information about this event may be priced at a premium. Of similar importance is information about the story that is not derived from the content may contribute to additional attributes. This information is related to the content of the story but is externally gathered and may include, for example, sentiment, reputation of the document's author, reputation of the document's publisher, geographical location of the author and/or the publisher, a source of the document, etc.

Valuation

Once the stories' attributes are compiled they can be used for making various determinations relevant to valuation (pricing) of the stories. Notably, there are at least two types of attributes. One type of attributes identifies characteristics of the story that apply generically to all classes/domains, e.g., an author. Another class of attributes identifies characteristics of the story that are specific to some class/domain. Thus, the generic attributes may be used to ascertain the class/domain of the story, e.g., politics and sport. Consequently, the compiled stories' attributes may be used to select valuating functions corresponding to each of the individual stories based on their (1) specific attributes; and (2) specific and generic attributes, which may be weighted.

Furthermore, as discussed above some attributes of the stories in the same class/domain will have different weights, which may be stored as an indication, e.g., a percentage, of importance of the attribute to the class/domain of the story, e.g., 2%; 7%; 10%; 15%, 21%; 30%, etc. A valuation function for a specific story is defined such that the weights of the attributes increases/decreases the value of the document. Thus, due to the celebrity attribute and the injury attribute, the valuation function for the "Lebron James" story from the example above will increase the value of the story over its lifetime by 67% and 20% respectively when contrasted with the default class/domain valuation function.

Accordingly, on the basis of totality of their attributes, each story/document $(d_1, \ldots, d_m)$ is associated with one of a plurality of valuation functions $v_i(t)$, where i is the index of the document and t is time of the document's commercial viability or lifetime, which will be described below. The valuation function is selected based on the attributes $(w_1^{(i)}, \ldots, w_n^{(i)})$ of each of the documents. Mapping from the document's attributes to valuation function is provided as follows:

$$\varphi_1(w_1^{(i)}, \ldots, w_n^{(i)}) \rightarrow v_i(t) \qquad \text{Valuation Function}$$

$$\varphi_2(w_1^{(i)}, \ldots, w_n^{(i)}) \rightarrow v_0^{(i)} = v_i^{(0)} \qquad \text{Initial Value}$$

Examples of valuation functions $v_i(t)$ for different documents $d_1$, $d_2$, and, $d_3$ are shown in FIGS. 4a, 4b, and 4c.

Valuation by Class/Domain

Figure 5A:
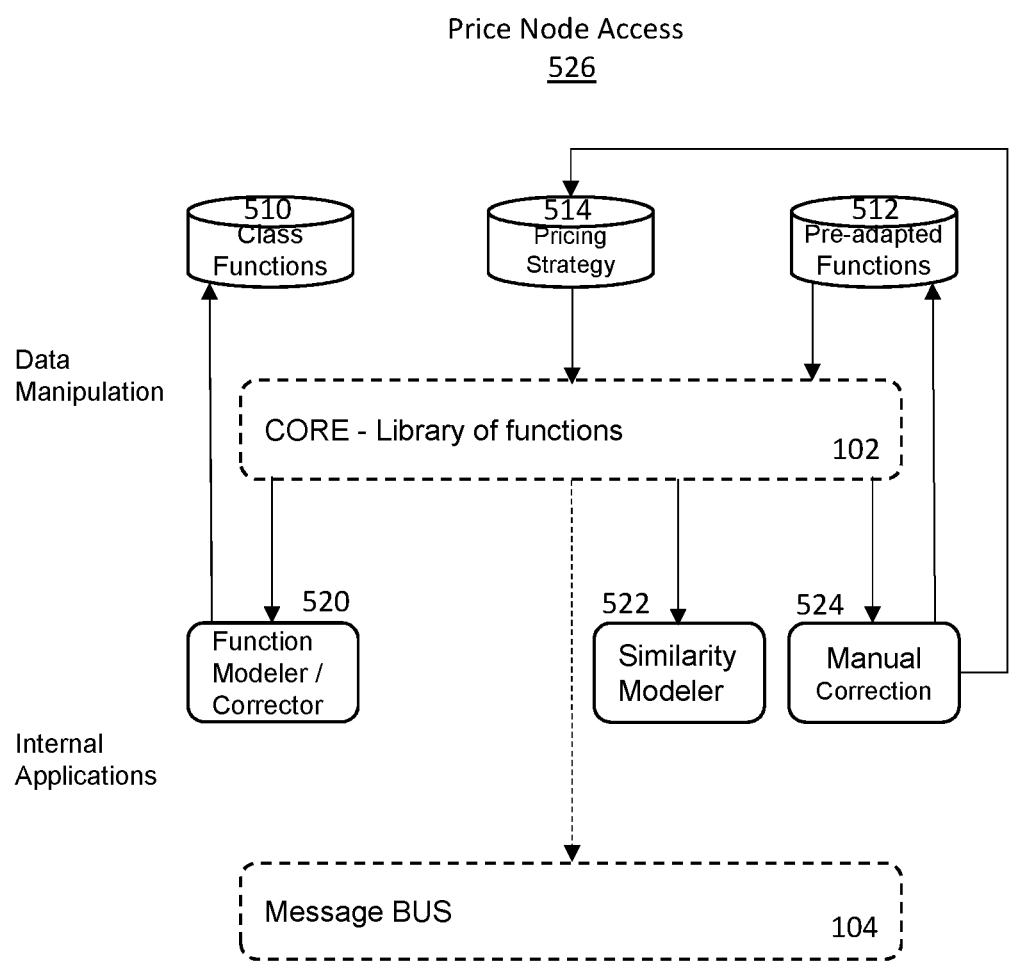
FIG. 5a is a diagram illustrating processing and database components performing provision and pairing of Valuation Functions with the stories in accordance with the present system.

While processing of digital content items or stories in general from receipt, through setting prices, and to sale will be discussed below with reference to FIG. 5c, construction and use of specific valuation functions will be discussed herein with reference to FIGS. 5a and 5b. Importantly, as illustrated in FIG. 5a, upon receipt of a new story, Price Node Access 526 will attach or assign to the new story a valuation function selected from Class-Specific Valuation Functions database 510 or Pre-adapted Valuation Functions database 512.

Valuation functions for specific class/domains, without knowledge of generic attributes and weights of the story may be pre-defined for a default lifetime using Function Modeler 520 and stored in Class-Specific Valuation Functions database 510. These valuation functions may be formed by experts most familiar with consumer behavior related to consumption of stories in the various specific classes/domains and the lifetime or sustainability of the consumption. For example, experts in on-line sales of various types of literature, familiar with price premiums placed on various authors and literary genres, may be considered fit to formulate the default valuation functions for poems. In addition, Function Modeler 520 enables manual corrections to be made to the valuation functions for the specific classes/domains in Class-Specific Valuation Functions database 510. Similarly, expert knowledge harnessed in on-line databases and websites like Wikipedia.org may be used to formulate or pre-define valuation functions that are specific to known classes/domains.

However, there is a disadvantage in using valuation functions that are specific to the class/domain instead of to weighted generic and specific attributes of the story. The disadvantage is in that without adaptation of the valuation function by a process responsive to historic consumer behavior that is described in detail below, the valuation function will not reflect learned consumer behavior responsive to price fluctuation. In other words, it is advantageous to assign the valuation functions, which have been previously adapted (changed) in response to consumer purchases of stories having similar attributes.

Valuation by Self Learning

After a number of stories are processed by the system 100 (FIG. 1), many valuation functions would have been assigned, adapted to the consumer behavior as described below, and stored in Pre-adapted Valuation Functions database 512. Thus, after some initial period, the system will collect and archive numerous valuation functions associated with stories having weighted specific and generic attributes and which have been adapted to consumer behavior. Manual Corrections module 524 enables experts and publishers to make manual corrections to any of the valuation functions in Pre-adapted Valuation Functions database 512.

To find existing valuation functions reflective of, or anticipating consumer behavior, it is important to determine similarity or closeness between the attributes of the stories. To this end, Similarity Modeler 522 constructs similarity models based on the stories stored in Stories database 110 (FIG. 1). In one exemplary embodiment illustrated by the flowchart of FIG. 5b, the above described pre-processing is performed by Text Processor 320 (FIG. 3) in step S510, in which the stories, articles or documents $(d_1, d_2, \ldots, d_i)$, where i is an index uniquely identifying individual documents are analyzed; the documents' keywords are extracted; and vectors of attributes for each of the stories are formed and stored. In step S512, Similarity Modeler 522 maps the vectors of attributes of the stories represented as positive real numbers $(w_1, \ldots, w_n)$, where $n \in [0,1]$ to form similarity models. A coordinate $K \in \{1, \ldots, n\}$ may be used as a measure of a space attribute.

Weight vector representations or similarity models may be formed to describe each document, i.e., $d_i \xrightarrow{\psi} (w_1^{(i)}, \ldots, w_n^{(i)})$ and stored in Stories database 110 (FIG. 1) in associations with their respective documents. As explained above, the various attributes w's are expressions of the document's key words indicating, e.g., a source; events described; an author or writer; an intended audience; buying power and/or geography of the intended audience; timing of the subject matter; half-life of interest of the intended audience in the subject matter; images imbedded.

Consequently, a comparison of any one of the documents, i.e., $(d_1, \ldots, d_m)$ to another, or new document $d_{m+1}$, can be achieved using these documents' respective similarity models. At step S514, similarity between documents, e.g., $d_i$, and $d_j$ can be defined as:

$$\sigma(d_i, d_j) = \frac{<(w^{(i)}, w^{(j)})>}{\|(w^{(i)})\|, \|w^{(j)}\|} = \frac{\sum_{k=1}^{n} w_k^{(i)}, w_k^{(j)}}{\left(\sum_{k=1}^{n} w^{(ij)2}\right)^{\frac{1}{2}} \left(\sum_{k=1}^{n} w^{(ij)2}\right)^{\frac{1}{2}}}$$

where $\sigma \in [0,1]$ fraction measures aggregate similarity as a percentage of difference between documents $d_i$, and $d_j$, a function $\sigma_k(d_i, d_j)$ is then defined to measure local/coordinate similarity as follows:

$$\sigma_k(d_i, d_j) = |w_k^{(i)}, w_k^{(j)}| \in [0,1]$$

After the similarity between document $d_{m+1}$ and documents $(d_1, \ldots, d_m)$ is calculated these documents $(d_1, \ldots d_m)$ can be ranked in relation to their closeness to document $d_{m+1}$.

Thus, to measure similarity between documents $(d_1, \ldots, d_m)$ and a document $d_{m+1}$, relationships $(\sigma_{1, m+1}, \ldots \sigma_{m, m+1})$ can be calculated and at step S516 ranked in accordance with the similarity metric as follows:

$$\sigma_{1,m+1} = \sigma(d_1, d_{m+1}); \sigma_{2,m+2} = \sigma(d_2, d_{m+1}); \ldots; \sigma_{m,m+1} = \sigma(d_m, d_{m+1})$$

Consequently, to assign to a new story an existing valuation functions reflective of past consumer behavior vis-à-vis a story having similar attributes, closest one or more previously processed content items are identified based on similarity of their attributes with attributes of the new content item. The identified content items are ranked and a predetermined number of these ranked content items are averaged, using weighted averaging, In addition, prior to weighted averaging the adapted valuation functions may be normalized, if their lifetimes are different, e.g., 30 minutes, 24 hours, 3 weeks, etc. An example of this is illustrated in FIGS. 4a-4d, where valuation functions of stories having attributes similar to attributes of the new story are shown in FIGS. 4a-4c and the resulting valuation function is illustrated in 4d. For example, the story $d_1$ in FIG. 4a can be 35%; the story $d_2$ in FIG. 4b can be 15%; and the story $d_3$ in FIG. 4c can be 40% similar to the new story $d_i$ of FIG. 4d.

Pricing

Figure 5C:
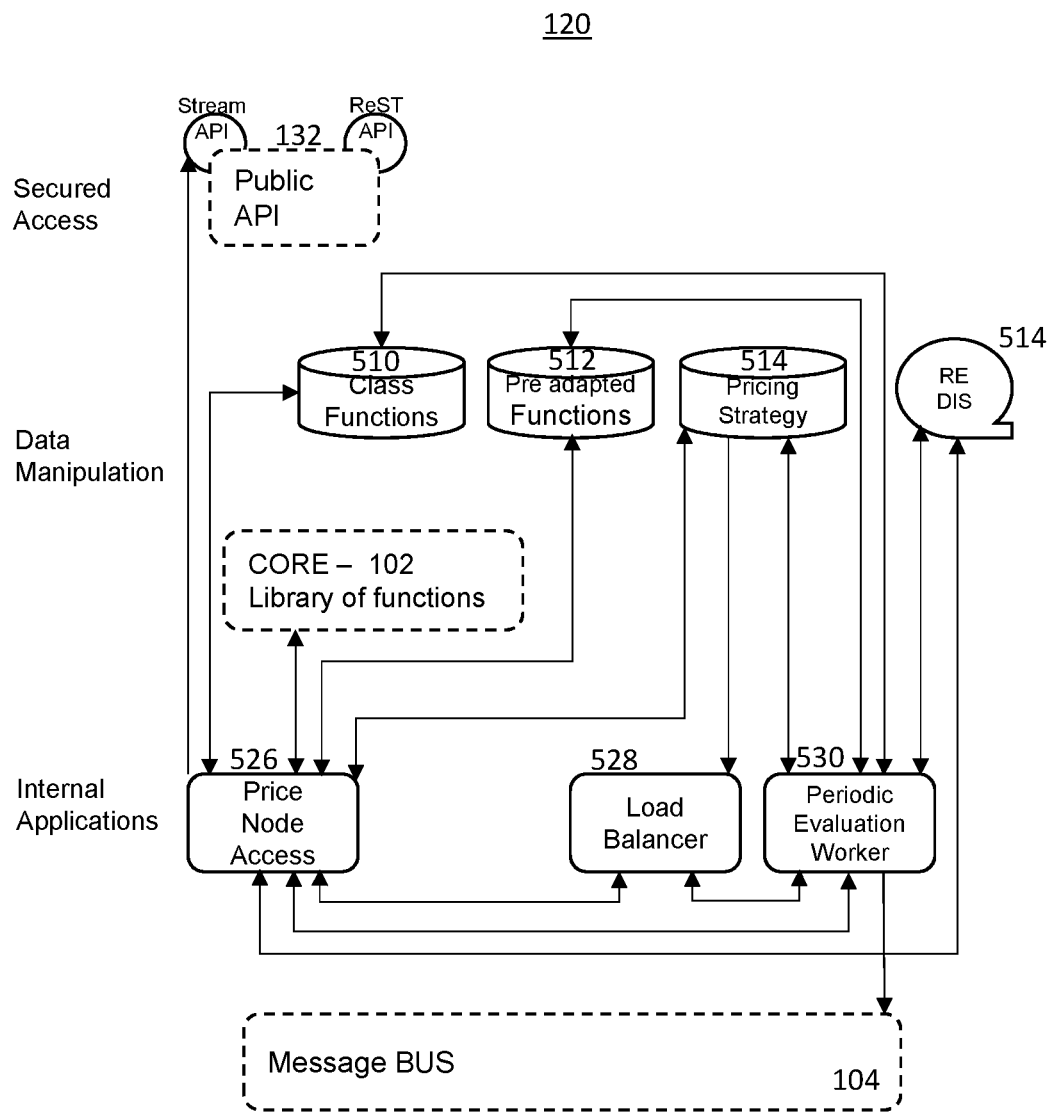
FIG. 5c is a diagram illustrating selection and adaptation of valuation functions based on a market response in accordance with the present system.

FIG. 5c illustrates Pricing module 120, upon receipt of new stories, Price Access Node 526 initiates instances of Periodic Evaluation Worker 530 to determine and assign to the new stories a respective valuation functions as discussed above with reference to FIGS. 5a and 5b. Thus, as discussed, (1) if Periodic Evaluation Worker 530 determines existence of valuation functions in Pre-adapted Valuation Functions database 512 that are associated with stories having similar attributes to the attributes of the new stories, Periodic Evaluation Worker 530 will derive new valuation functions from a predetermined number of the closest similar determined valuation functions and assign them to the respective new stories. (2) Otherwise, valuation functions from Class-Specific Valuation Functions database 510 that corresponding to the class/domain of the new stories will be assigned to the new stories. (3) Furthermore, if corresponding valuation functions are not found in Pre-adapted Valuation Functions database 512 or in Class-Specific Valuation Functions database 510, new valuation functions will be created by adaptation.

The prices of the stories are derived as follows: Price Access Node 526 receives a new story; it requests Periodic Evaluation Worker 530 to determine and to execute the new story's valuation function, execution of the valuation function calculates a current price for the new story. Load Balancer 528 monitors and balances work load among instances of Periodic Evaluation Worker 530, i.e., how many stories are processed by a single instance at one time. Thus, because stories may be passed between the instances, Periodic Evaluation Worker 530 uses a data structure server 414, such as open source Redis software from Redis labs, to keep track of prices determined by the valuation functions of each of the stories. Once calculated, the value or price for each story or document is posted through Public API 132.

The posted prices may differ from these determined by the valuation function because of noise in determining the price, only price changes in excess of Δ % will be posted. This is calculated by defining $t_1$=first time t>0 such that $$\frac{|v_i(t) - v_o^{(i)}|}{v_0} > \Delta, \text{ then } v(t) = \begin{cases} v_0 & 0 \leq t \leq t_1 \\ v_1 & t \leq t_1 \end{cases}$$

In this manner, the posted price is changed only when the relative value change exceeds Δ %. So time $t_2$ is a first time after time $t_1$ such that:

$$\frac{|v_i(t) - v_i(t_1)|}{v_0} > \Delta$$

and then, the posted price is adjusted or changed again,

Furthermore, with reference back to FIG. 5c, it is noted that in addition to valuation functions, various pricing strategies can be supplied or set, e.g., by publishers, who may want to set certain constraints or dependencies on prices computed by the valuation functions. For example, price ceilings and/or floors may be set to indicate that a particular story should be sold at prices higher or lower than some pre-set defaults. Also, lifetimes of the stories or duration of time earmarked to selling of the story can be limited or extended. This information regarding changes to valuation functions strategies and for limits for prices and lifetimes is stored in Pricing Strategy database 514 and managed and changed by Manual corrections module 524.

Adaptation

As discussed, valuation functions are assigned to new stories based on correspondence or matches of the new stories' attributes to predefined strategies or attributes defining specific classes/domains. The valuation functions corresponding to the specific classes/domains are defined, prepared or entered into Class-Specific Valuation Functions database 510 by experts who are professionals most familiar with importance or weights of various events within the class/domain and sustainability of consumer interest relating to consumption of the stories within the class/domain over time.

Alternatively, when exact matches or mappings between the predefined strategies for specific classes/domains and a new stories' attributes are not found, a new valuation function is formed based on closeness of the weighted specific and generic attributes of the new stories to the attributes of previously processed stories. The new formed valuation functions are stored in Pre-adapted Valuation Functions database 512.

However, in situations where the correspondence and closeness are not found, a new valuation function for the new story will be trained by using adaptation, e.g., "edge cutting" to set an initial and further posted prices. Similarly, the "edge cutting" adaptation will be used to continually correct to market response, i.e., consumers' purchases and/or lack of purchases of the stories in response to price fluctuations, the prices calculated over the lifetimes of the stories by the assigned valuation functions as well as the valuation functions themselves.

Further, as discussed, valuation functions from Pre-adapted Valuation Functions database 512 can be changed, modified, or adjusted by the experts or operators via Manual Corrections module 524 (FIG. 5a). Similarly, valuation functions from Class-Specific Valuation Functions database 510 can be changed, modified, or adjusted by the experts or operators via Function Modeler/Corrector module 520 (FIG. 5a). For example, the valuation function for a sports story about basketball, which did not account for an injury to a celebrity player can be changed, modified, or adjusted by experts or operators in the domain of basketball, who are familiar with price premiums placed on stories describing player injury as they relate to known players and effects of particular injuries.

Importantly, there will be many stories for which the valuation function will not be found in Class-Specific and Pre-adapted Valuation Functions databases 510 and 512. For these stories the associated valuation function will be developed by adaptation.

Adaption to Market Response

Such new valuation function will be developed over the lifetime of the new story through adaptation of prices to the market response, i.e., the story being purchased by the consumers at dynamically changing prices. This adaptation manipulates values of the attributes derived from the text analysis of the story and on which the valuation function is based. The valuation function will react to manipulation of the attributes by calculating higher/lower prices.

Figure 6A:
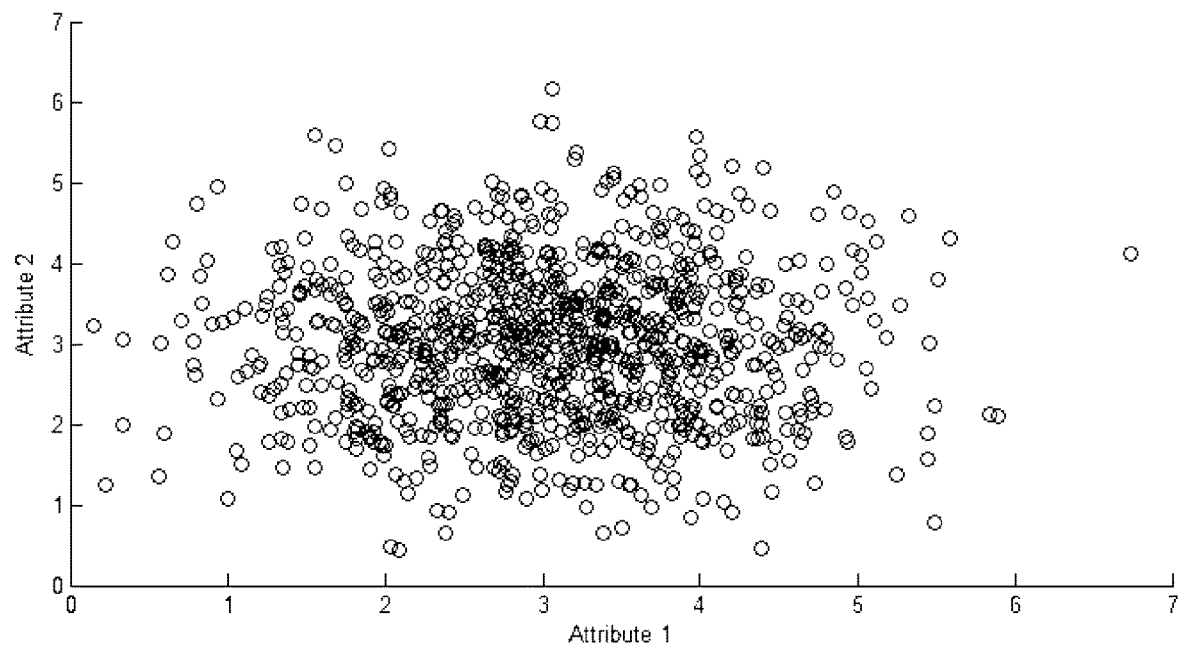
FIGS. 6a-6c are graphs illustrating "edge cutting" adaptation for determining optimal prices in accordance with the present system.

The adaptation is described with reference to FIGS. 6a-6d. FIG. 6a illustrates a graph of representations of documents $A_i$ having various attributes, as discussed above. For example, specific attributes representing, e.g., celebrity rating and injury severity or any other aspect of the displayed documents. The document can be represented as $A_i=\{a_1,a_2\}$, where attribute $a_1$ can represent a coordinate along the x-axis corresponding to Attribute 1 and $a_2$ can represent a coordinate along the y-axis corresponding to Attribute 2. The numerical values for scales of axes for both attributes were selected arbitrarily.

Figure 6B:
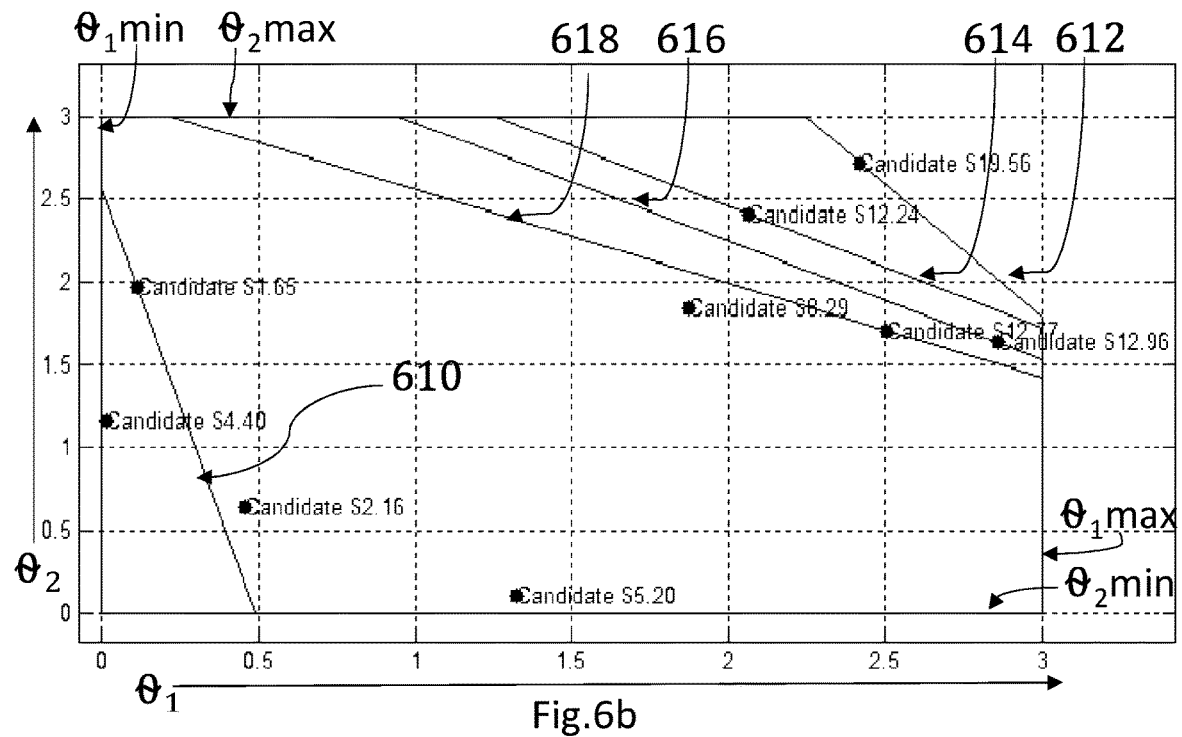

To price the documents $A_i$ a parameter space, illustrated in FIG. 6b, is used such that the parameters will not exceed maximum axial limits, i.e., max($\theta_1$) and max($\theta_2$) or fall below minimum axial limits, i.e., min($\theta_1$) and min($\theta_2$), where $\theta$ is a linear combination coefficient. The price for the documents may be presented as:

$$P_i = \Sigma_{j=1}^n \theta_j * a_j,$$

where i represents the index of the document and j represents the index of the documents' attributes, and the price values for the documents may range from $P_{min}$, e.g., $1, to $P_{max}$, e.g., $50.

In an example of a two dimensional space illustrated in FIG. 6b with linear combination candidates for $\theta$ given as $X=\{x_1,x_2\}$, where scales of axes for both $\theta_1$ and $\theta_2$ are arbitrarily selected numerical values between 0 and 3, and $x_1$, and $x_2$ are random numbers between 0 and 1, such that $$x_1 = (\max(\theta_1) - \min(\theta_1)) * \text{rand}(100,1) + \min(\theta_1), \text{ and}$$

$$x_2 = (\max(\theta_2) - \min(\theta_2)) * \text{rand}(100,1) + \min(\theta_2).$$

In the present example, 100 randomly generated points are uniformly distributed within the area or volume (where more than two attributes are used) shown in FIG. 6b. The number 100 is arbitrarily selected for this example. As well known to these skilled in the art, other appropriate numbers may be selected for uniform distribution within the space of all possible representations of the price $P_i$.

As shown in FIG. 6b points marked with the term "candidate" and an associated dollar amount are prices $P = \theta_1 * a_1 + \theta_2 * a_2$. Reject prices that do not satisfy the following constraints:

$$\begin{array}{cc} \text{Constraints} & \text{Bounds} \\ C & B \end{array}$$

$$\begin{bmatrix} 0 & 1 \\ 1 & 0 \\ 0 & -1 \\ -1 & 0 \end{bmatrix} \begin{bmatrix} \min(\theta_1) \\ \min(\theta_2) \\ -\max(\theta_1) \\ -\max(\theta_2) \end{bmatrix} \text{ Such that } C^* X_i \leq B \text{ for } i = 1 \text{ to } 1000.$$

Reject $X_i$ that do not satisfy the following constraints and select 100 points that do.

$$\begin{array}{cc} \text{Constraints} & \text{Bounds} \\ C & B \end{array}$$

$$\begin{bmatrix} 0 & 1 \\ 1 & 0 \\ 0 & -1 \\ -1 & 0 \\ a_1 & a_2 \\ -a_1 & -a_2 \end{bmatrix} \begin{bmatrix} \min(\theta_1) \\ \min(\theta_2) \\ -\max(\theta_1) \\ -\max(\theta_2) \\ P\min \\ -P\max \end{bmatrix} \text{ such that } C^* X_i \leq B \text{ for } i = 1 \text{ to } 1000.$$

Select extremum point X*.

$$\begin{array}{ll} X_i^* A_i = P_i & X_{12} = \$19.56\text{-overpriced} \\ \vdots & \vdots \\ \vdots & \text{then sort} & \vdots \\ \vdots & \vdots \\ X_{100} * A_i = P_{100} & X_{98} = \$1.65\text{-underpriced} \end{array}$$

Choose one of the extremum points, e.g., $X_{12}$ and $X_{98}$, as the sale price for the story and observe as follows:
a. for $X_{12}$, if the story is not being sold at $19.56, then
  i. Conclude that the story is overpriced, and,
  ii. Draw line 612 through the extremum point $X_{12}$ thereby removing space lying above and to the right of line 612.
b. for $X_{98}$, if the story is being sold at $1.65 at a rate exceeding some predefined threshold, then
  i. Conclude that the story is underpriced, and
  ii. Draw line 610 through the extremum point $X_{98}$ thereby removing space lying below and to the left of line 610.

Figure 6C:
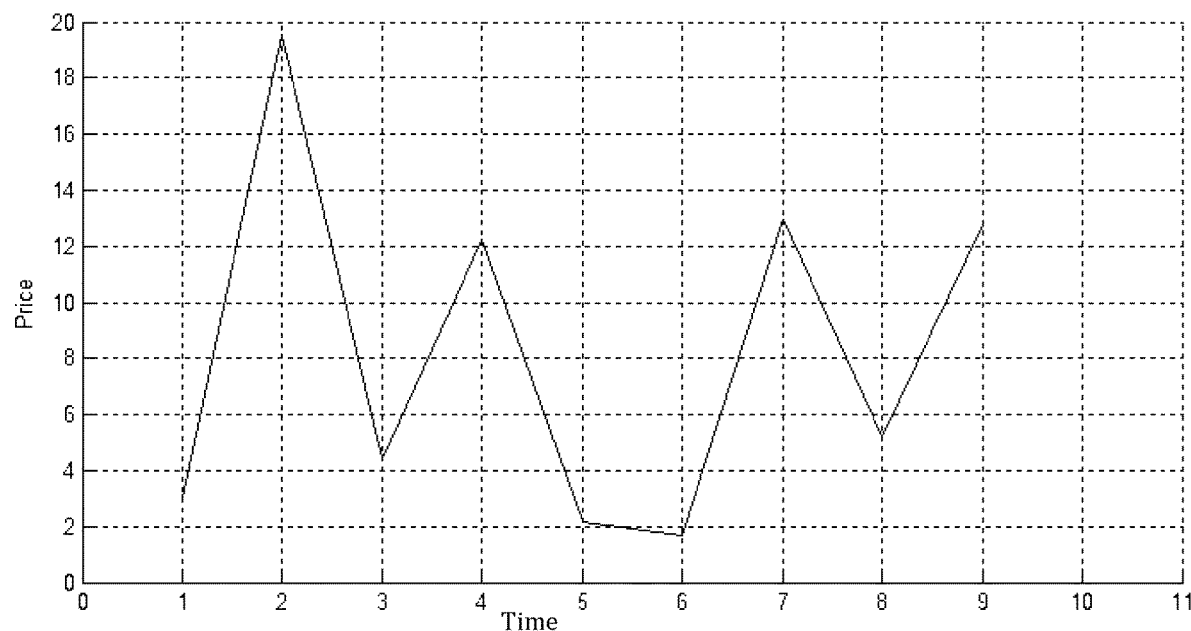

Continue narrowing the $\theta_1$ by $\theta_2$ space, i.e., by cutting at line 614 for candidates $12.24; at line 616 for candidates $12.96; and at line 618 for candidates $12.17; until the remaining $\theta_1$ by $\theta_2$ space the story is sold at an expected, predetermined rate. The candidate prices illustrated in FIG. 6b are also shown in FIG. 6c where the prices swings or fluctuation is minimized over time and the price is seen to converge on some value between about $12 and $6. When the candidate prices are the expected prices add to the constraints and bounds.

$$\begin{array}{cc} \text{Constraints} & \text{Bounds} \\ C & B \end{array}$$

$$\begin{bmatrix} 0 & 1 \\ 1 & 0 \\ 0 & -1 \\ -1 & 0 \\ a_1' & a_2' \\ \vdots & \vdots \\ \vdots & \vdots \\ -a_1' & -a_1' \end{bmatrix} \begin{bmatrix} \min(\theta_1) \\ \min(\theta_2) \\ -\max(\theta_1) \\ -\max(\theta_2) \\ \text{if sold } X' * A' \\ \vdots \\ \vdots \\ \text{if not sold- } X' * A' \end{bmatrix}$$

Figure 6D:
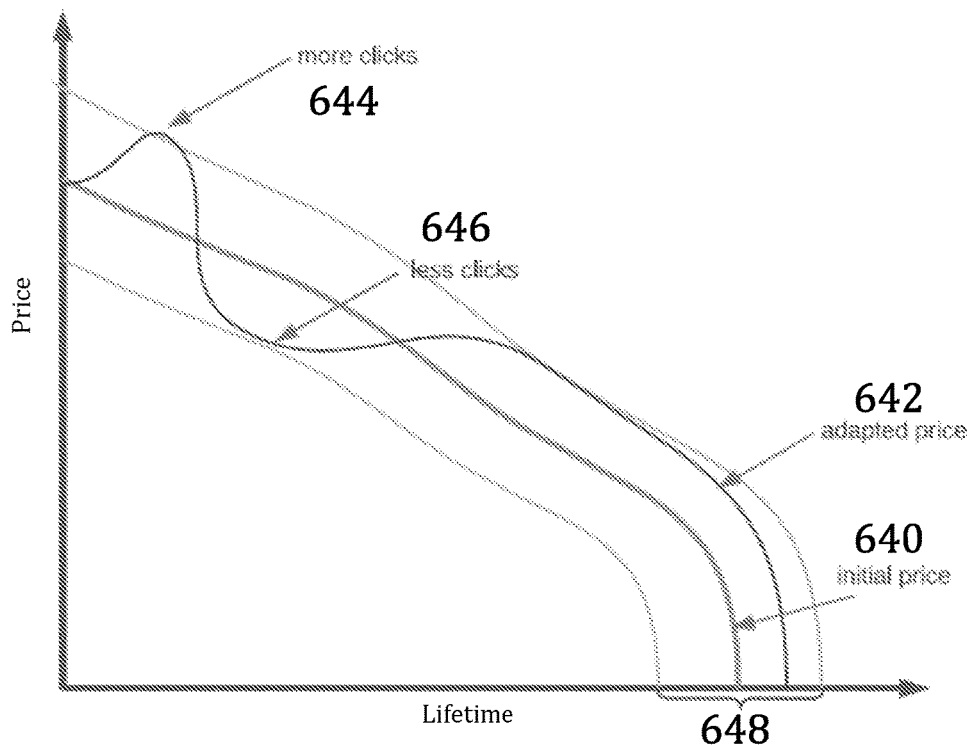
FIG. 6d is a graph illustrating "edge cutting" adaptation used to correct pre-existing functions to calculate optimal prices in accordance with the present system.

Finally, FIG. 6d shows adaptation of an existing or initial price function 640 that calculates a market value of the story or content item during its lifetime for forming adapted price function 642. The adaptation can use the edge cutting method described above to move the price determined by the function higher when the story is purchased more, as indicated by more clicks 644. Alternatively, the adaptation can move the price determined by the function lower when the story is purchased less, as indicated by fewer or less clicks 646. The adaptation is performed at predetermined intervals during the story's lifetime and during each interval, the price or value is allowed to change, i.e., increase or decrease to some predetermined maximum amount 648 from the initial price function 640.

Processor

Figure 7:
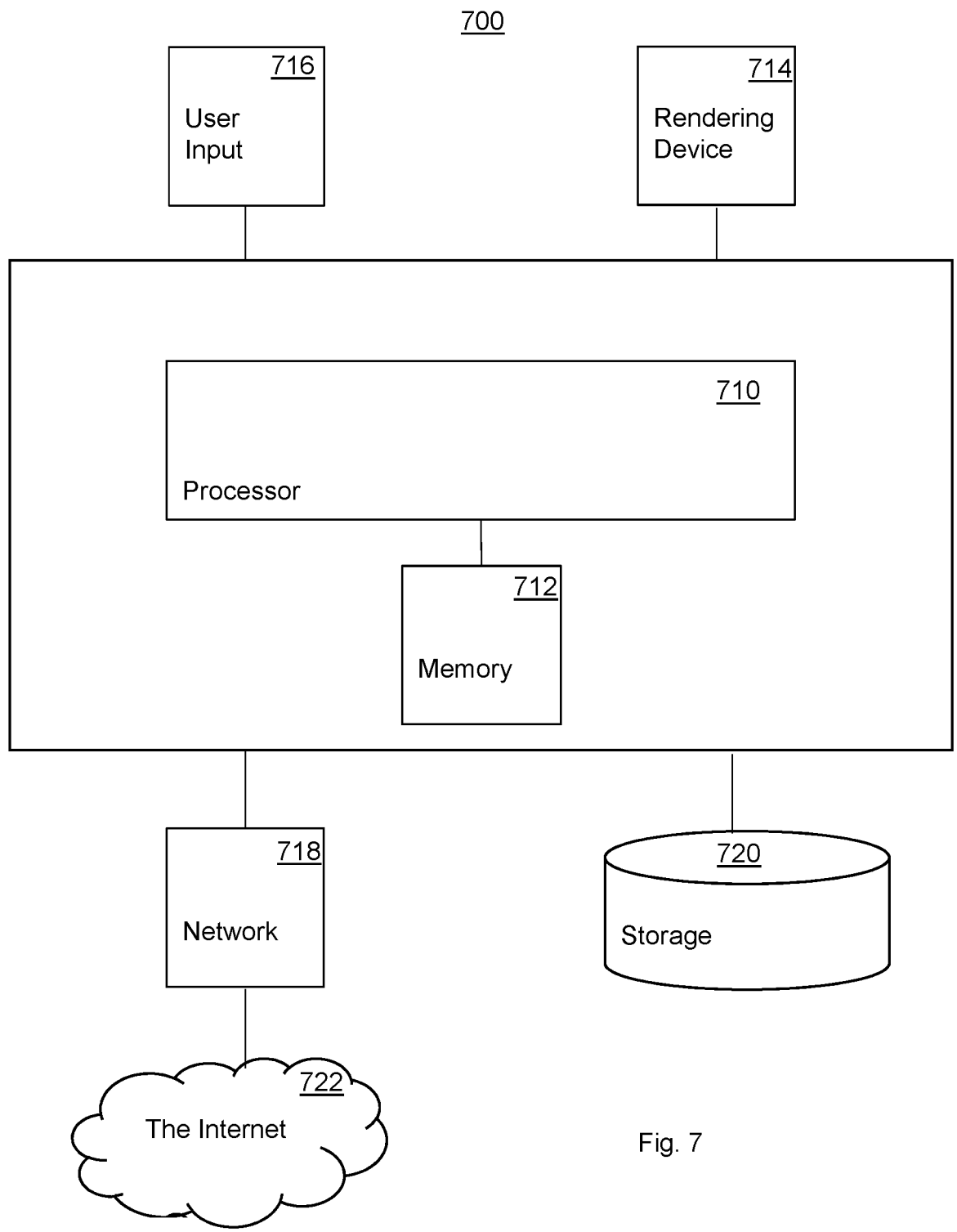
FIG. 7 is a diagram illustrating the components making up one or more computing devices for performance of steps in accordance with the preferred embodiment.

FIG. 7 shows a system 700, which represents an example of a computing device utilized to implement and execute the various modules described above with reference to the External Applications; Secured Access; Data Manipulation; and Internal Applications layers and any other programs discussed with reference to the Figs. One or more systems 700 may be used to execute the above-discussed modules, programs, and maintain the databases. Similarly, it will be apparent to these skilled in the art that each of these programs may be subdivided into separate discrete units of programming code. Any bundling of these units is done to simplify the narrative of this discussion.

The system 700 includes a processor 710 operationally coupled to a memory 712, an optional rendering device 714, such as one or more of a display terminals, one or more user input devices 716, a network interface 718 connectable via wired or wireless means to a network 722, e.g., the Internet, and optionally a local storage 720. The user input 716 may include a keyboard, mouse or other devices including touch sensitive displays communicating with the processor 710 via any type of link, such as a wired or wireless link. The user input device 716 is operable for interacting with the processor 710 including interaction within a paradigm of a UI such as a GUI and/or other elements of the present system, such as to enable web browsing, content selection, such as provided by left and right clicking on a device, a mouse-over, pop-up menu, radio button, etc., such as provided by user interaction with a computer mouse, etc., as may be readily appreciated by a person of ordinary skill in the art. Thus it is clear that the processor 710, memory 712, optional rendering device 714, user input device 716, and network adapter 718 may be portions of a computer system or other device.

The storage 720 may be any fixed or removable computer-readable medium, e.g., ROM and RAM, CD-ROM, hard drives, or memory cards. Any medium known or developed that may store and/or transmit information suitable for use with the computer system may be used as the computer-readable medium. Such computer-readable medium may be used to store all the discussed programs for execution by processor 710. The network adapter 718 should be understood to include further network connections to other user devices, systems, e.g., routers, modems, etc. While not shown for purposes of simplifying the description, it is readily appreciated that the network adapter 718 may include an operable interconnection between networked processors, which may host websites.

Provisions

While the present system has been described with reference to exemplary embodiments, it should also be appreciated that numerous modifications and alternative embodiments may be devised by those having ordinary skill in the art without departing from the broader and intended spirit and scope of the present system as set forth in the claims that follow.

The section headings included herein are intended to facilitate a review but are not intended to limit the scope of the present system. Accordingly, the specification and drawings are to be regarded in an illustrative manner and are not intended to limit the scope of the appended claims. In interpreting the appended claims, it should be understood that:

a. the word "comprising" does not exclude the presence of other elements or acts than those listed in a given claim;

b. the word "a" or "an" preceding an element does not exclude the presence of a plurality of such elements;

c. any reference signs in the claims do not limit their scope;

d. several "means" may be represented by the same item or hardware or software implemented structure or function;

e. any of the disclosed elements may be comprised of hardware portions (e.g., including discrete and integrated electronic circuitry), software portions (e.g., computer programming), and any combination thereof;

f. hardware portions may be comprised of one or both of analog and digital to portions;

g. any of the disclosed devices, portions thereof, acts, etc., may be combined together or separated into further portions, acts, etc., unless specifically stated otherwise;

h. no specific sequence of acts or steps is intended to be required including an is order of acts or steps indicated within a flow diagram; and i. the term "plurality of" an element includes two or more of the claimed element, and does not imply any particular range of number of elements; that is, a plurality of elements may be as few as two elements, and may include an immeasurable number of elements.

What is claimed is:

1. A method of valuating a plurality of digital content items and offering the valuated plurality of digital content items to consumers on devices connected to a network, the method comprising:

receiving, by a processor, the plurality of digital content items from one or more websites and databases of content distributors over the network;

for each received content item:

analyzing, by the processor, content of the received content item via natural language processing techniques to identify keywords and establish a plurality of attributes from the identified keywords indicating significance of the received content item, wherein the plurality of attributes are used to express a class or domain of the received content item;

establishing, by the processor, a lifetime indicating a span of consumers' interest in the received content item; and defining, by the processor, a valuation function for determining a market value of the received content item during its lifetime, wherein the market value determined by the valuation function is based on the plurality of attributes, and defining the valuation function comprises:

finding and ranking nearest one or more previously processed content items having a plurality of attributes with closest similarity to the plurality of attributes of the received content item, and performing weighted averaging of valuation functions associated with the nearest one or more of the previously processed and ranked content items;

displaying, by the processor, the plurality of digital content items along with their market values on webpages on browsers of the devices of the consumers;

detecting, by the processor, from the devices of the consumers, clicks indicating online accesses of the plurality of digital content items by the consumers based on the displayed content items and market values;

determining, by the processor, a market response reflecting behavior of the consumers in response to the market values of the plurality of digital content items based on the online accesses;

adapting, by the processor, using edge cutting, the defined valuation function according to the determined market response for continually correcting the market values of the plurality of digital content items by learning from the determined market response, wherein the market values are dynamically varying based on the continual correction and are streamed along with the plurality of digital content items in real-time to the consumers over the network; and updating continually, by the processor, the market values of the plurality of digital content items on the webpages on the browsers of the devices of the consumers with the dynamically varying market values.

2. The method of claim 1, wherein the network comprises the Internet, wherein each of the plurality of digital content items comprises metadata and data including at least one of text, audio, video, and still images, and wherein the metadata and data comprise the keywords.

3. The method of claim 1, further comprising:

forming, by the processor, the plurality of attributes corresponding to the keywords, wherein the plurality of attributes includes generic and specific elements.

4. The method of claim 3, wherein the generic elements of the plurality of attributes identify one of a plurality of domains defining known classes of the received content item.

5. The method of claim 4, further comprising pre-defining, by the processor, valuation functions for one or more of the plurality of domains, wherein the pre-defining of valuation functions for a particular domain of the plurality of domains is performed by one or more experts in the particular domain.

6. The method of claim 4, wherein, when one or more of the plurality of digital content items ranked by the closest similarity do not exist, an act of defining the valuation function comprises:

adapting a pre-defined valuation function for a domain identified by the plurality of attributes of the received content item.

7. The method of claim 6, wherein, when a valuation function for the domain identified by the plurality of attributes of the received content item was not pre-defined, the act of defining the valuation function comprises:

training the valuation function by determining an initial value of the received content item using the edge cutting.

8. The method of claim 1, further comprising forming, by the processor, similarity models for each of the plurality of digital content items to enable identifying and ranking similar of the plurality of digital content items.

9. The method of claim 1, further comprising:

formulating, by an application on a device of a consumer, a code snippet based on content distribution requirements of a content distributor provided to the application, wherein the code snippet is custom crafted for a website of the content distributor in accordance with the content distribution requirements and maintained by the processor in a library, and wherein the code snippet is for placement on the website of the content distributor for distribution to the browsers of the devices of the consumers; and securely supporting and delivering, by the processor, the code snippet to external applications running on the devices of the consumers, wherein the external applications are executed by the consumers by using network browsing programs on the devices for performing one or more activities.

10. The method of claim 9, wherein the one or more activities include at least an activity related to an online registration, an activity related to a purchase of credit, an activity related to authoring of digital content items for adding to a content database, or an activity related to a purchase of access to one of the plurality of digital content items by using the purchased credit.

11. The method of claim 1, wherein the valuation function of the received content item is defined, by the processor, such that weights of the plurality of attributes increase or decrease the market value of the received content item.

12. A system for valuating a plurality of digital content items and offering the valuated plurality of digital content items to consumers on devices connected to a network, the system comprising:

at least one processor configured to:

receive the plurality of digital content items from one or more websites and databases of content distributors over the network;

for each received content item:

analyze content of the received content item via natural language processing techniques to identify keywords and establish a plurality of attributes from the identified keywords indicating significance of the received content item, wherein the plurality of attributes are used to express a class or domain of the received content item;

establish a lifetime indicating a span of consumers' interest in the received content item;

define a valuation function for determining a market value of the received content item during its lifetime, wherein the market value determined by the valuation function is based on the plurality of attributes, and defining the valuation function comprises:

finding and ranking nearest one or more previously processed content items having a plurality of attributes with closest similarity to the plurality of attributes of the received content item, and performing weighted averaging of valuation functions associated with the nearest one or more of the previously processed and ranked content items;

display the plurality of digital content items along with their market values on webpages on browsers of the devices of the consumers;

detect, from the devices of the consumers, clicks indicating online accesses of the plurality of digital content items by the consumers based on the displayed digital content items and market values;

determine a market response reflecting behavior of the consumers in response to the market values of the plurality of digital content items based on the online accesses;

adapt, using edge cutting, the defined valuation function according to the determined market response for continually correcting the market values of the plurality of digital content items by learning from the determined market response, wherein the market values are dynamically varying based on the continual correction and are streamed along with the plurality of digital content items in real-time to the consumers over the network; and update continually the market values of the plurality of digital content items on the webpages on the browsers of the devices of the consumers with the dynamically varying market values.

13. The system of claim 12, wherein the network comprises the Internet, wherein each of the plurality of digital content items comprises metadata and data including at least one of text, audio, video, and still images, and wherein the metadata and data comprise the keywords.

14. The system of claim 12, wherein the at least one processor is further configured to:

form the plurality of attributes corresponding to the keywords, wherein the plurality of attributes includes generic and specific elements.

15. The system of claim 14, wherein the generic elements of the plurality of attributes identify one of a plurality of domains defining known classes of the received content item.

16. The system of claim 15, wherein the at least one processor is further configured to pre-define valuation functions for one or more of the plurality of domains, wherein the pre-defining of valuation functions for a particular domain of the plurality of domains is performed by one or more experts in the particular domain.

17. The system of claim 15, wherein the at least one processor is further configured to define the valuation function by adapting a pre-defined valuation function for a domain identified by the plurality of attributes of the received content item, when one or more of the plurality of digital content items ranked by the closest similarity do not exist.

18. The system of claim 17, wherein the at least one processor is further configured to define the valuation function by training the valuation function by determining an initial value of the received content item using the edge cutting, when a valuation function for the domain identified by the plurality of attributes of the received content item was not pre-defined.

19. The system of claim 12, wherein:
the system includes a device of a consumer including a processor with an application configured to formulate a code snippet based on content distribution requirements of a content distributor provided to the application, wherein the code snippet is custom crafted for a website of the content distributor in accordance with the content distribution requirements and maintained by the at least one processor in a library, and wherein the code snippet is for placement on the website of the content distributor for distribution to the browsers of the devices of the consumers; and
the at least one processor is further configured to securely support and deliver the code snippet to external applications running on the devices of the consumers, wherein the external applications are executed by the consumers by using network browsing programs on the devices for performing one or more activities, and
wherein the one or more activities include at least an activity related to an online registration, an activity related to a purchase of credit, an activity related to authoring of digital content items for adding to a content database, or an activity related to a purchase of access to one of the plurality of digital content items.

* * * * *